United States Patent
Fukawatase et al.

(10) Patent No.: US 7,938,441 B2
(45) Date of Patent: May 10, 2011

(54) AIR BAG DEVICE FOR KNEE PROTECTION, DEPLOYMENT METHOD FOR AIR BAG DEVICE FOR KNEE PROTECTION, AND VEHICLE

(75) Inventors: Osamu Fukawatase, Aichi (JP); Makoto Sekizuka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 157 days.

(21) Appl. No.: 12/298,545

(22) PCT Filed: May 10, 2007

(86) PCT No.: PCT/JP2007/059693
§ 371 (c)(1),
(2), (4) Date: Oct. 27, 2008

(87) PCT Pub. No.: WO2007/132743
PCT Pub. Date: Nov. 22, 2007

(65) Prior Publication Data
US 2010/0013200 A1    Jan. 21, 2010

(30) Foreign Application Priority Data

May 15, 2006   (JP) .................................. 2006-134866

(51) Int. Cl.
*B60R 21/203* (2006.01)
(52) U.S. Cl. .................... 280/731; 280/728.3; 280/730.1
(58) Field of Classification Search .................. 280/731, 280/730.1, 728.3
See application file for complete search history.

(56) References Cited

U.S. PATENT DOCUMENTS

| | | | | |
|---|---|---|---|---|
| 3,794,349 | A | * | 2/1974 | Fuller ............................ 280/732 |
| 5,324,071 | A | * | 6/1994 | Gotomyo et al. ........... 280/730.1 |
| 5,570,901 | A | | 11/1996 | Fyrainer |
| 6,837,514 | B1 | * | 1/2005 | Fujita et al. .................... 280/731 |
| 6,902,186 | B2 | * | 6/2005 | Suzuki et al. ............... 280/730.1 |
| 6,945,557 | B2 | * | 9/2005 | Takimoto et al. ........... 280/730.1 |
| 7,232,149 | B2 | * | 6/2007 | Hotta et al. ................. 280/730.1 |
| 7,370,879 | B2 | * | 5/2008 | Hotta et al. ................. 280/728.2 |
| 7,578,517 | B2 | * | 8/2009 | Fukawatase et al. ....... 280/730.1 |
| 7,669,890 | B2 | * | 3/2010 | Bito ............................ 280/731 |
| 7,681,908 | B2 | * | 3/2010 | Fukawatase et al. ...... 280/728.3 |
| 7,703,799 | B2 | * | 4/2010 | Takagi ....................... 280/728.3 |
| 7,708,310 | B2 | * | 5/2010 | Adachi et al. ................. 280/731 |
| 2003/0094795 | A1 | | 5/2003 | Takimoto et al. |
| 2003/0132617 | A1 | | 7/2003 | Takimoto et al. |

(Continued)

FOREIGN PATENT DOCUMENTS

JP                05105013 A  *  4/1993

(Continued)

*Primary Examiner* — Paul N Dickson
*Assistant Examiner* — N. Verley
(74) *Attorney, Agent, or Firm* — Finnegan, Henderson, Farabow, Garrett & Dunner, LLP

(57) ABSTRACT

In a vehicle front structure 12, when there is a frontal collision of a vehicle, an air bag 32 is inflated and deployed to the outside of a column cover 22, and thereby, the knees of a driver are restrained and protected by the air bag 32. A right side wall 28C and a left side wall 28D of a second lower column cover 28 are opened by the air bag 32 inflating and deploying. Consequently, the air bag 32 can be inflated and deployed with certainty to the vehicle right and left sides of the column cover 22.

18 Claims, 10 Drawing Sheets

U.S. PATENT DOCUMENTS

2005/0046158 A1 * 3/2005 Abe ..................... 280/730.1

FOREIGN PATENT DOCUMENTS

| JP | 5-208646 | 8/1993 |
| JP | 8-301054 | 11/1996 |
| JP | 9-104317 | 4/1997 |
| JP | 10-71911 | 3/1998 |
| JP | 2001-106013 | 4/2001 |
| JP | 2002-37003 | 2/2002 |
| JP | 2002-370599 | 12/2002 |
| JP | 2003-312432 | 11/2003 |
| JP | 2005-67466 | 3/2005 |
| JP | 2006-62422 | 3/2006 |
| JP | 2007-131082 | 5/2007 |
| WO | WO 02/04262 A1 | 1/2002 |

* cited by examiner

AIR BAG DEVICE FOR KNEE PROTECTION, DEPLOYMENT METHOD FOR AIR BAG DEVICE FOR KNEE PROTECTION, AND VEHICLE

CROSS-REFERENCE TO RELATED APPLICATIONS

This application is a national phase application of International Application No. PCT/JP2007/059693, filed May 10, 2007, and claims the priority of Japanese Application No. 2006-134866, filed May 15, 2006, the contents of both of which are incorporated herein by reference.

TECHNICAL FIELD

The present invention relates to an air bag device for knee protection, to a deployment method for the air bag device for knee protection, and to a vehicle comprising the air bag device for knee protection.

RELATED ART

An air bag device for knee protection is known in which there is an opening to the angled portions at the vehicle-right side and vehicle-left side at the bottom of a column cover, and an air bag inflates and deploys to the bottom, the vehicle-right side and the vehicle-left side of the column cover (see, for example, Japanese Patent Application Laid-Open (JP-A) No. 2002-37003).

With respect to the above, it is desirable that in such an air bag device for knee protection the air bag inflates and deploys to the vehicle-right side and the vehicle-left side of the column cover with certainty, so as to be capable of protecting the knees of a vehicle occupant.

DISCLOSURE OF THE INVENTION

The present invention is made in the light of the above consideration and an objective thereof is to provide an air bag device for knee protection with an air bag capable of deploying to the vehicle-right side and the vehicle-left side of the column cover with certainty, a deployment method for an air bag device for knee protection, and a vehicle.

An air bag device for knee protection of a first aspect is an air bag device for knee protection including: a column cover that covers a steering column of a vehicle; opening doors provided at the column cover so as to be openable; an air bag provided within the column cover, the air bag deploying to the vehicle-right side and the vehicle-left side of the column cover by opening of the opening doors that are respectively provided within the range of a vehicle-right-side wall and a vehicle-left-side wall of the column cover, the air bag being thus configured to protect the knees of a vehicle occupant.

In the air bag device for knee protection of the first aspect, the steering column of the vehicle is covered by the column cover, and the air bag is provided within the column cover. The air bag is deployed from the column cover by the opening of the opening doors provided in the column cover, the air bag being thus configured to protect the knees of the vehicle occupant.

With respect to this, the opening doors are respectively provided within the range of the vehicle-right-side wall and the vehicle-left-side wall of the column cover, and the air bag is deployed to the vehicle-right side and the vehicle-left side of the column cover by the opening of these opening doors. Consequently, the air bag can be deployed to the vehicle-right side and the vehicle-left side of the column cover with certainty.

An air bag device for knee protection of a second aspect is the air bag device for knee protection according to the first aspect, wherein the opening door that is provided at a bottom wall of the column cover opens after the opening doors at the vehicle-right-side wall and the vehicle-left-side wall of the column cover have opened.

In the air bag device for knee protection of the second aspect, the opening door that is provided at the bottom wall of the column cover opens after the opening doors at the vehicle-right-side wall and the vehicle-left-side wall of the column cover have opened. Consequently, the air bag is capable of protecting the knee of the vehicle occupant even when the knee is disposed below the column cover.

An air bag device for knee protection of a third aspect is the air bag device for knee protection according to the first aspect or the second aspect, further including: a collision prediction sensor for predicting a vehicle collision; a door opener that opens the opening doors in the vehicle-right-side wall and the vehicle-left-side wall of the column cover when a vehicle collision is predicted by the collision prediction sensor.

In the air bag device for knee protection of the third aspect, the door opener opens the opening doors at the vehicle-right-side wall and the vehicle-left-side wall of the column cover when a vehicle collision is predicted by the collision prediction sensor. The air bag can consequently be deployed at an early stage to the vehicle-right side and the vehicle-left side of the column cover.

An air bag device for knee protection of a fourth aspect is the air bag device for knee protection according to any one of the first to the third aspects, further including: a regulator that regulates the opening of at least one of the opening doors caused by the deploying of the air bag.

In the air bag device for knee protection of the fourth aspect, the regulator regulates the opening of at least one of the opening doors caused by the deploying of the air bag. Appropriate opening of at least one of the opening doors can thereby be achieved.

An air bag device for knee protection of a fifth aspect is the air bag device for knee protection according to the fourth aspect, wherein the regulator is a break portion that is thin in comparison to the thickness of other portions of the column cover, the break portion being provided at an edge portion on the periphery of at least one of the opening doors at the column cover.

In the air bag device for knee protection of the fifth aspect, the regulator is the break portion that is provided at the edge portion on the periphery of at least one of the opening doors at the column cover, the break portion is thin in comparison to the thickness of other portions of the column cover. The opening doors can consequently be opened by the break portion breaking.

An air bag device for knee protection of a sixth aspect is the air bag device for knee protection according to the fourth aspect or the fifth aspect, wherein the regulator is the thickness of the opening doors at the vehicle-right-side wall and the vehicle-left-side wall of the column cover, which are thinner than the thickness of the opening door at the bottom wall of the column cover.

In the air bag device for knee protection of the sixth aspect, the regulator is the thickness of the opening doors at the vehicle-right-side wall and the vehicle-left-side wall of the column cover, which are thinner than the thickness of the opening door at the bottom wall of the column cover. The opening door at the bottom wall of the column cover can thereby be opened after the opening doors at the vehicle-right-side wall and the vehicle-left-side wall of the column cover have opened.

An air bag device for knee protection of a seventh aspect is the air bag device for knee protection according to any one of the fourth to the sixth aspects, wherein the regulator is the rigidity of the material of the opening doors at the vehicle-right-side wall and the vehicle-left-side wall of the column cover, being weaker than the rigidity of the material of portions of the column cover other than at the opening doors at the vehicle-right-side wall and the vehicle-left-side wall of the column cover.

In the air bag device for knee protection of the seventh aspect the regulator is the rigidity of the material of the opening doors at the vehicle-right-side wall and the vehicle-left-side wall of the column cover, being weaker than the rigidity of the material of portions of the column cover other than at the opening doors at the vehicle-right-side wall and the vehicle-left-side wall of the column cover. The opening doors at the vehicle-right-side wall and the vehicle-left-side wall of the column cover can thereby be appropriately opened.

A deployment method for an air bag device for knee protection of an eleventh aspect is a deployment method for an air bag device for knee protection including: providing an air bag device for knee protection including a column cover that covers a steering column of a vehicle, opening doors provided at the column cover so as to be openable, and an air bag provided within the column cover; and deploying the air bag to the vehicle-right side and the vehicle-left side of the column cover by opening of the opening doors that are respectively provided within the range of a vehicle-right-side wall and a vehicle-left-side wall of the column cover, enabling the air bag to protect the knees of a vehicle occupant.

A vehicle of a twentieth aspect is a vehicle including the air bag device for knee protection according to any one of the first to the tenth aspects.

BEST MODE OF IMPLEMENTING THE INVENTION

First Exemplary Embodiment

Figure 1:
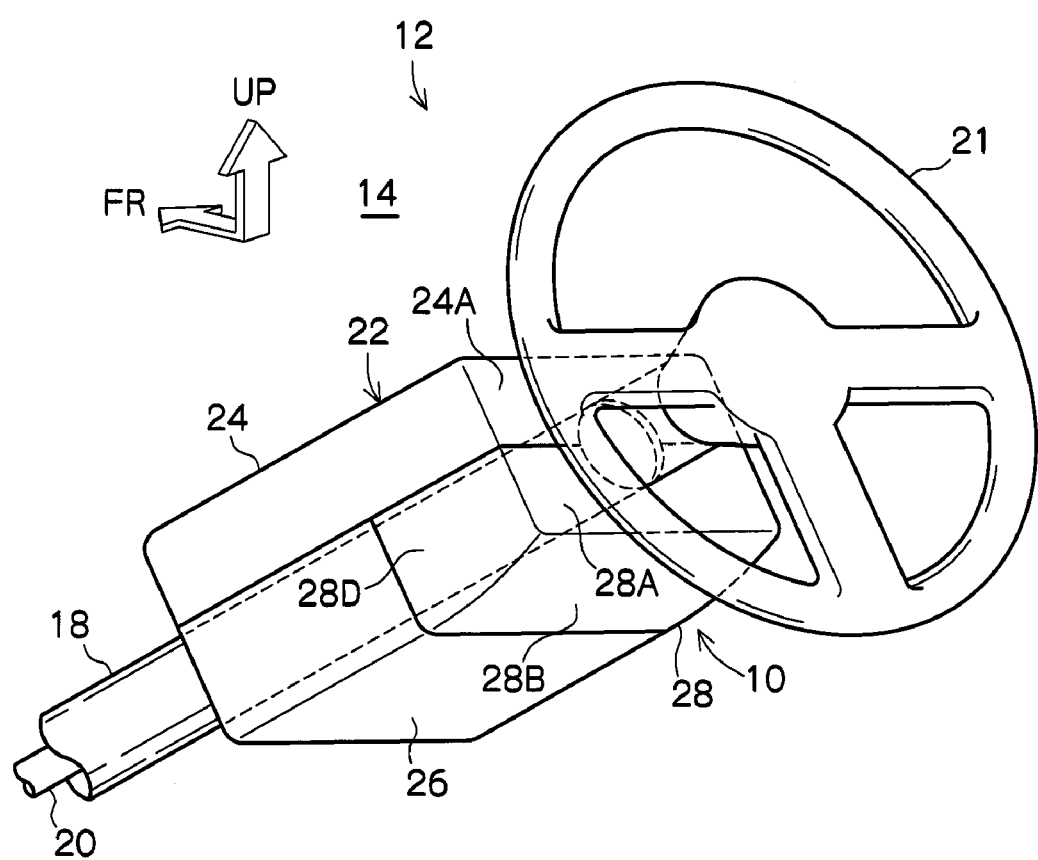
FIG. 1 is a perspective view showing a vehicle front structure according to the first exemplary embodiment of the present invention, as viewed at an angle from the rear left of the vehicle.
Figure 3:
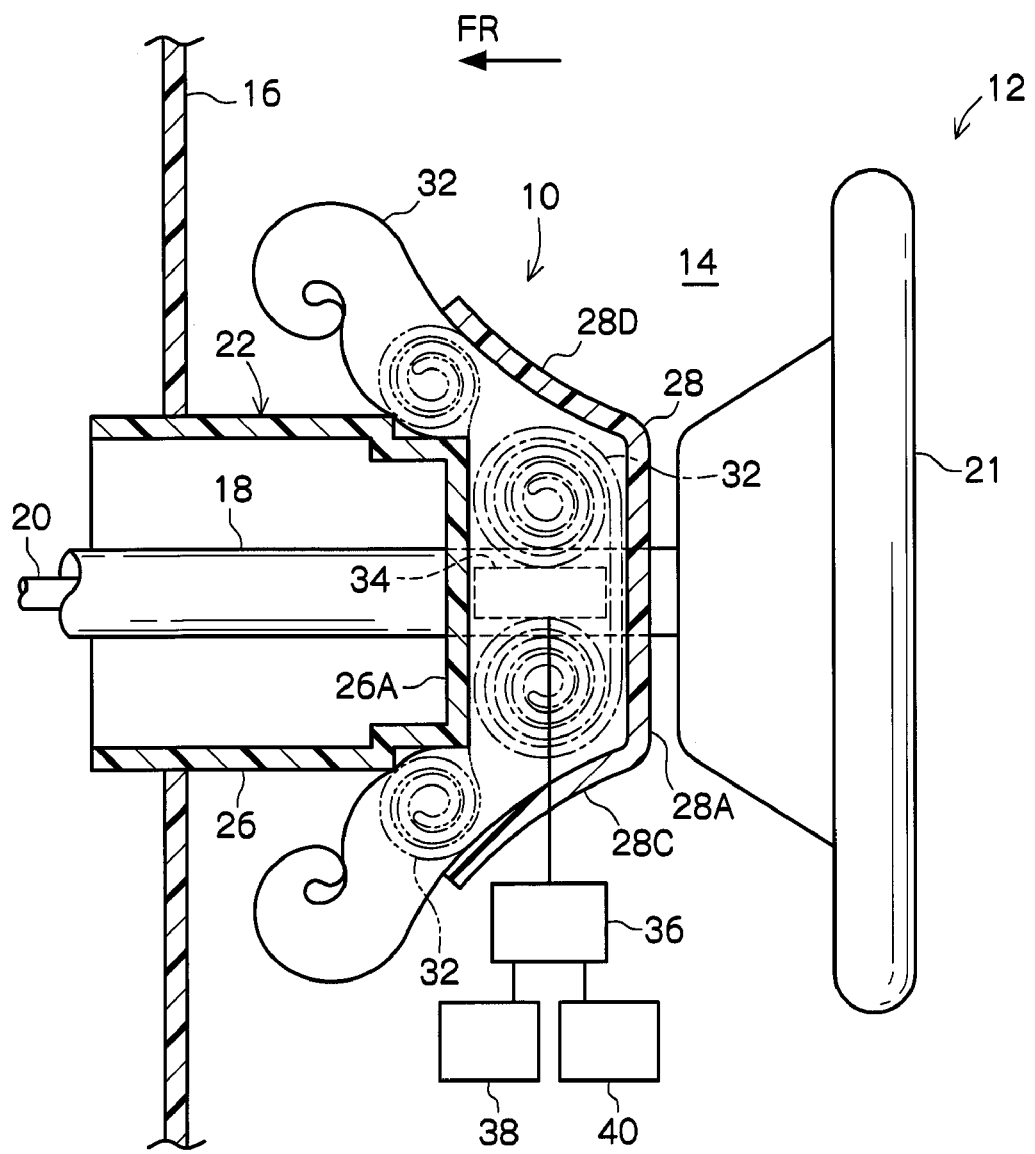
FIG. 3 is a cross-section showing the inflated deployed state of the air bag of the vehicle front structure according to the first exemplary embodiment of the present invention, as seen from below.

A perspective view of a vehicle front structure 12 is shown in FIG. 1, configured with an air bag device for knee protection 10 according to the first exemplary embodiment of the present invention applied thereto, as viewed at an angle from the rear left of the vehicle. A cross-section of the vehicle front structure 12, is shown in FIG. 3 as seen from below. It should be noted that in the drawings the vehicle front direction is indicated by the arrow FR, and the vehicle up direction is indicated by the arrow UP.

There is an instrument panel 16 provided in the vehicle front structure 12 of the present exemplary embodiment, at the vehicle-front-end of a vehicle cabin 14. A steering column 18 is provided either at a vehicle-right-side portion or a vehicle-left-side portion of the instrument panel 16, and the steering column 18 protrudes out from within the instrument panel 16 at an angle upwards toward the rear of the vehicle.

A circular shaft shaped steering shaft 20 is accommodated within the steering column 18, and the vehicle rear end of the steering shaft 20 protrudes out toward the rear of the vehicle from the vehicle rear end face of the steering column 18. A steering wheel 21 is fixed to the vehicle rear end of the steering shaft 20, and the steering wheel 21 faces the driver's seat (omitted in the figures) as a seat in the vehicle cabin 14. A driver (omitted in the figures) as a vehicle occupant is in a seated state in the driver's seat facing toward the vehicle front, and the driver steers the vehicle by manipulating (rotational operation) of the steering wheel 21.

The entire periphery of the steering column 18 is covered by a substantially rectangular tube shaped column cover 22, and the vehicle front end of the column cover 22 is inserted into the instrument panel 16, and the vehicle rear end face of the column cover 22 is closed, except for a portion thereof through which the steering column 18 passes.

The column cover 22 is configured with an upper column cover 24 on the upper side thereof, with a first lower column cover 26 on the lower and vehicle-front side thereof, and with a second lower column cover 28 on the lower and vehicle-rear side thereof. The material is the same for the upper column cover 24, the first lower column cover 26 and the second lower column cover 28.

The bottom face of the upper column cover 24 and the upper face of the first lower column cover 26 are open, and the vehicle-right-side wall and the vehicle-left-side wall of the upper column cover 24 are connected respectively to the vehicle-right-side wall and the vehicle-left-side wall of the first lower column cover 26. The vehicle rear face of the upper column cover 24 is closed off by an upper rear wall 24A, except for a portion thereof through which the steering column 18 passes, and the vehicle rear face of the first lower column cover 26 is also closed off by an central rear wall 26A, except for a portion thereof through which the steering column 18 passes.

Figure 4A:
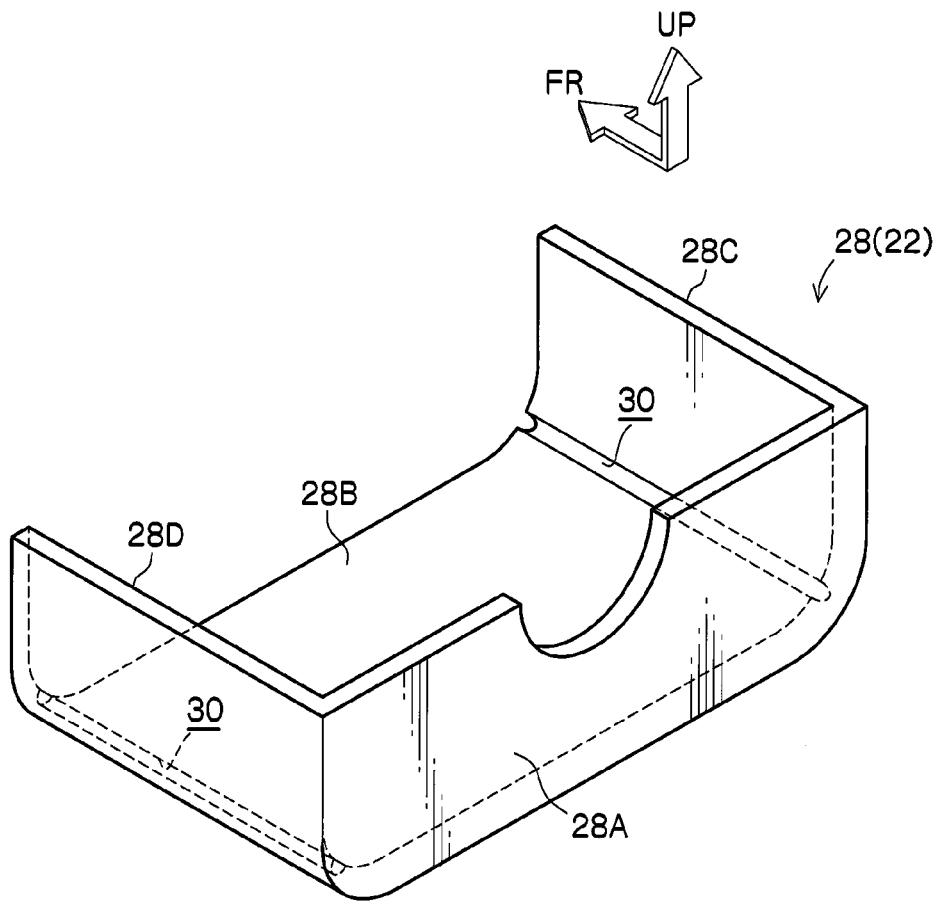
FIG. 4A is a perspective view showing a second lower column cover of an air bag device for knee protection according to the first exemplary embodiment of the present invention, as viewed at an angle from the rear left of the vehicle.
Figure 4B:
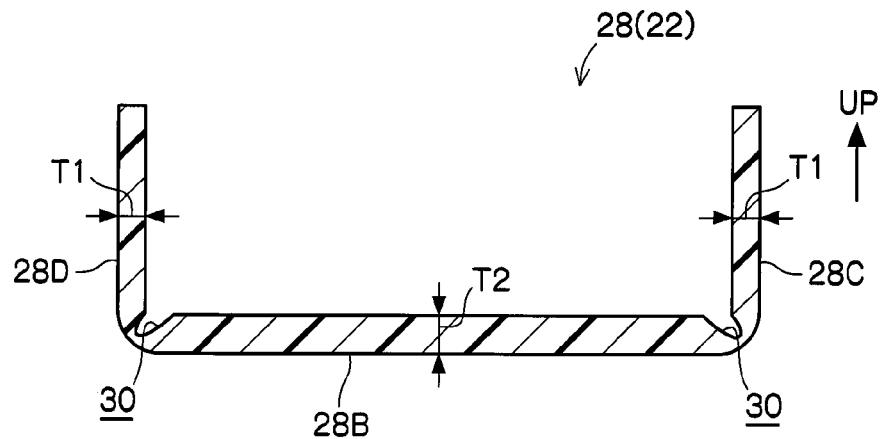
FIG. 4B is a cross-section showing the second lower column cover of the air bag device for knee protection according to the first exemplary embodiment of the present invention, as seen from the vehicle rear.

The upper face and the vehicle front face of the second lower column cover 28 are open, and the central rear wall 26A of the first lower column cover 26 is disposed at the vehicle front face of the second lower column cover 28, as shown in the details of FIG. 4A and FIG. 4B. The vehicle rear face of the second lower column cover 28 is closed off by a lower rear wall 28A, except for a portion thereof through which the steering column 18 passes, and the lower rear wall 28A of the second lower column cover 28 is connected to the upper rear wall 24A of the upper column cover 24.

The bottom face of the second lower column cover 28 is closed off by a bottom wall 28B, serving as a opening door, and the bottom wall 28B is not connected to the bottom wall of the first lower column cover 26. The vehicle-right-side wall and the vehicle-left-side wall of the second lower column cover 28 are respectively closed off by, respectively, a right side wall 28C and a left side wall 28D, which serve as opening doors. The right side wall 28C and the left side wall 28D are not connected, respectively, to the vehicle-right-side wall and the vehicle-left-side wall of the upper column cover 24, and they are also not connected, respectively, to the vehicle-right-side wall and the vehicle-left-side wall of the first lower column cover 26.

The thickness of the right side wall 28C and of the left side wall 28D of the second lower column cover 28 are both the same thickness T1, and, as a regulator, the thickness T1 of the right side wall 28C and the left side wall 28D is thinner in comparison to a thickness T2 of the bottom wall 28B. Accordingly, the rigidity of the right side wall 28C and the left side wall 28D is comparatively weaker than the rigidity of the bottom wall 28B. The thickness T2 of the bottom wall 28B is also the same as the thickness of the lower rear wall 28A of the second lower column cover 28 and the thickness of the upper column cover 24 and the first lower column cover 26.

Indentation shaped tear portions 30, serving as break portions, are formed at the inner surface of the boundary portion (angled portion) between the right side wall 28C and the bottom wall 28B of the second lower column cover 28, and at the inner surface of the boundary portion (angled portion) between the left side wall 28D and the bottom wall 28B. The thickness of the tear portions 30 formed to the second lower column cover 28 is thinner in comparison to the thickness of the right side wall 28C, left side wall 28D, bottom wall 28B and lower rear wall 28A of the second lower column cover 28.

There is an air bag 32 accommodated within the second lower column cover 28, and the side portions of the air bag 32 at both sides in the width direction of the vehicle are respectively rolled up in a spiral shape when viewed from below (see the single dash intermittent lines on FIG. 3).

There is a substantially circular cylindrical shaped inflator 34, serving as a deployment component, provided within the second lower column cover 28, and the inflator 34 is fixed to the bottom face of the steering column 18. There is a gas ejection hole (omitted in the figures) formed in a vehicle rear end portion of the inflator 34, and the gas ejection hole communicates with the central portion in the width direction of the air bag 32.

A control device 36, serving as a door opener, is connected to the inflator 34, and a collision detection sensor 38 and a collision prediction sensor 40 are connected to the control device 36. The collision detection sensor 38 is capable of detecting a frontal collision of the vehicle, and the collision prediction sensor 40 is capable of predicting a frontal collision of the vehicle.

Explanation will now be given of the operation of the present exemplary embodiment.

Figure 2:
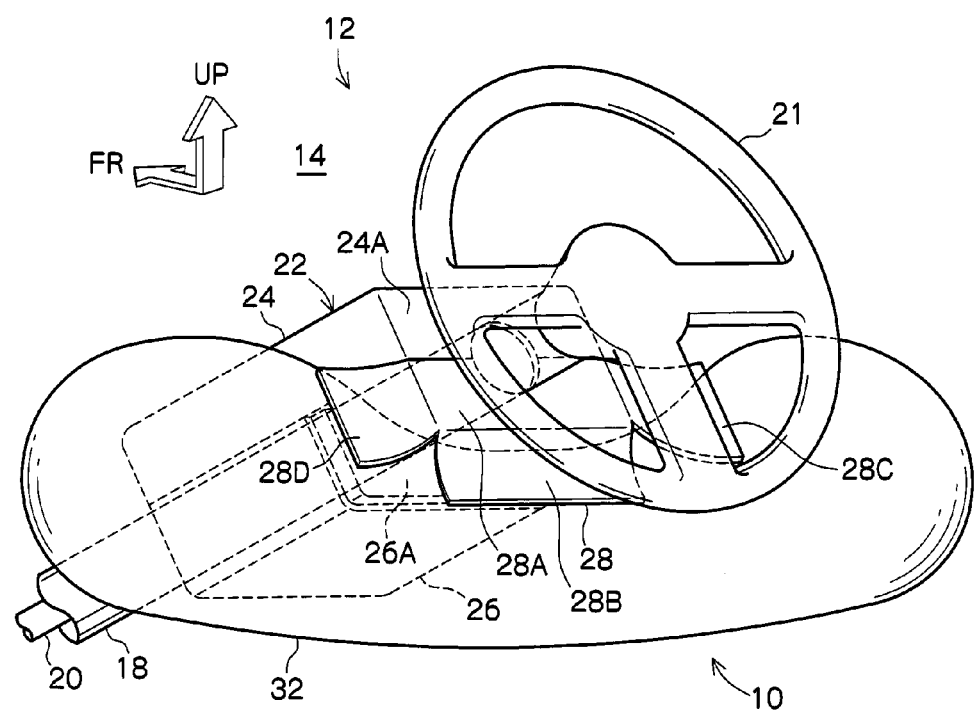
FIG. 2 is a perspective view showing an inflated deployed state of an air bag of the vehicle front structure according to the first exemplary embodiment of the present invention, as viewed at an angle from the rear left of the vehicle.
Figure 5A:
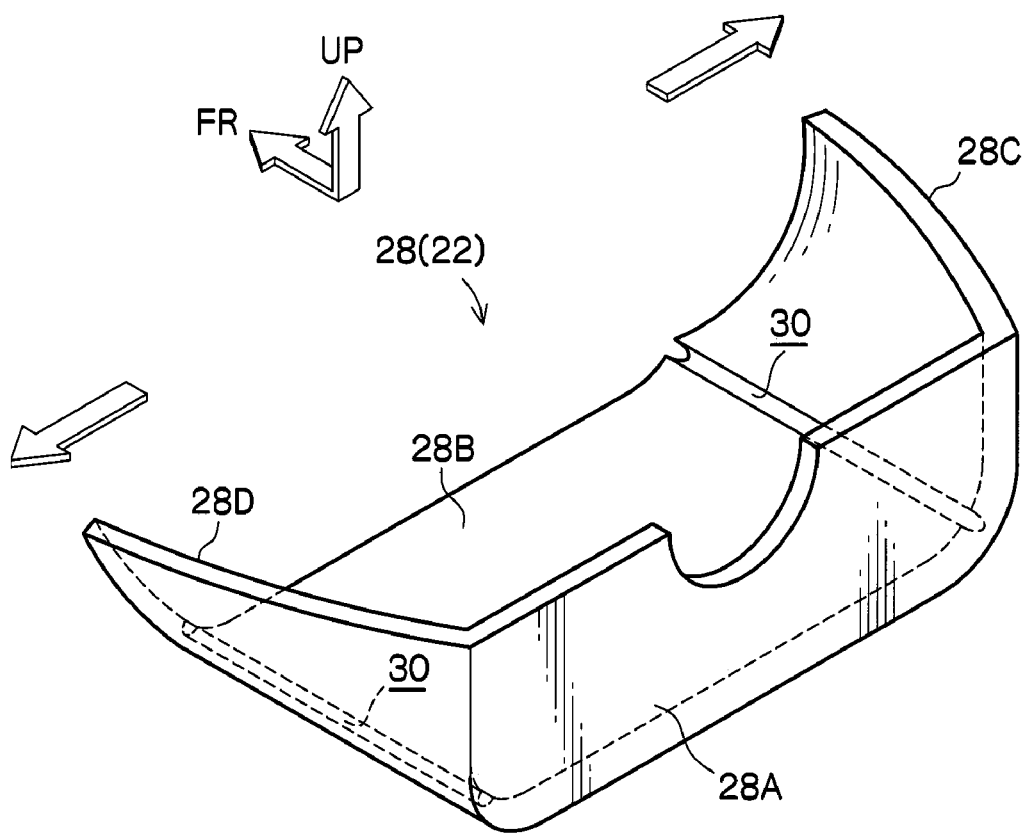
FIG. 5A is a perspective view showing, just before opening, the right wall, left wall and bottom wall of the second lower column cover of the air bag device for knee protection according to the first exemplary embodiment of the present invention, as viewed at an angle from the rear left of the vehicle.
Figure 5B:
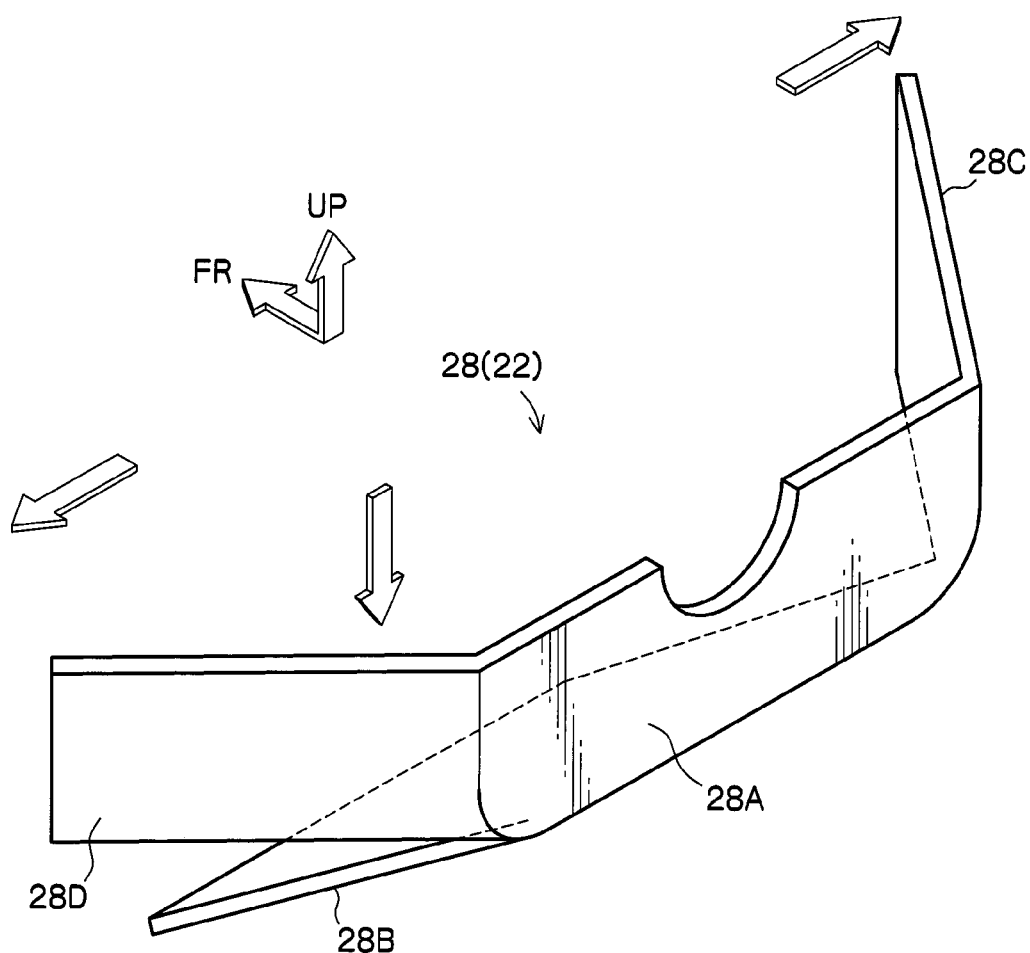
FIG. 5B is a perspective view showing, after opening, the right wall, left wall and bottom wall of the second lower column cover of the air bag device for knee protection according to the first exemplary embodiment of the present invention, as viewed at an angle from the rear left of the vehicle.

In the vehicle front structure 12 of the above described configuration, when the vehicle is involved in a frontal collision (when the collision detection sensor 38 has detected a frontal collision of the vehicle), the inflator 34, under the control of the control device 36, ejects gas from the gas ejection hole. The gas is introduced into the air bag 32, and thereby the air bag 32 is inflated and deployed at the portion within the column cover 22 surrounded by the central rear wall 26A of the first lower column cover 26 and the second lower column cover 28. Furthermore, the air bag 32 is inflated and deployed and, as shown in FIG. 5A, due to the pressure thereof on the right side wall 28C, the left side wall 28D, and the bottom wall 28B of the second lower column cover 28, the pair of tear portions 30 of the second lower column cover 28, as shown in FIG. 5B, break toward the vehicle rear portion from the vehicle front portion, and the right side wall 28C, the left side wall 28D and the bottom wall 28B respectively rotate and open out, with the boundary portion between the right side wall 28C and the lower rear wall 28A of the second lower column cover 28, the boundary portion of the left side wall 28D and the lower rear wall 28A of the second lower column cover 28, and the boundary portion of the bottom wall 28B and the lower rear wall 28A of the second lower column cover 28 as the rotational centers (hinge portions). By so doing, the air bag 32, as shown in FIG. 2, inflates and deploys to the vehicle-right side, to the vehicle-left side and the bottom of the column cover 22 at the vehicle-rear side of the instrument panel 16, from the opened out right side wall 28C, left side wall 28D and bottom wall 28B, the air bag 32 is thereby able to restrain and protect both knees of the driver moving in the vehicle forward direction under inertia.

With respect to the above, by the opening out of the right side wall 28C and the right side wall 28C of the second lower column cover 28 as described above, the inflation and deploying of the air bag 32 toward the vehicle-right side and the vehicle-left side of the column cover 22 can be assured. Therefore, the air bag 32 can restrain and protect both knees of the driver before the knees of the driver collide with the instrument panel 16.

In addition, the thickness T1 of the right side wall 28C and the left side wall 28D of the second lower column cover 28 is thinner in comparison to the thickness T2 of the bottom wall 28B of the second lower column cover 28, and the bottom wall 28B of the second lower column cover 28 is opened after the right side wall 28C and the left side wall 28D of the second lower column cover 28 have opened. Therefore, the air bag 32 can be even more assuredly inflated and deployed to the vehicle-right side and the vehicle-left side of the column cover 22. However, even when the knee of the driver is below the column cover 22, for example such as when the driver is operating the brake (omitted in the figures) below the column cover 22 of the vehicle prior to the frontal collision of the vehicle, the air bag 32 can restrain and protect the knee by the air bag 32 inflating and deploying to the vehicle-rear side of the bottom face of the first lower column cover 26.

Second Exemplary Embodiment

Figure 6:
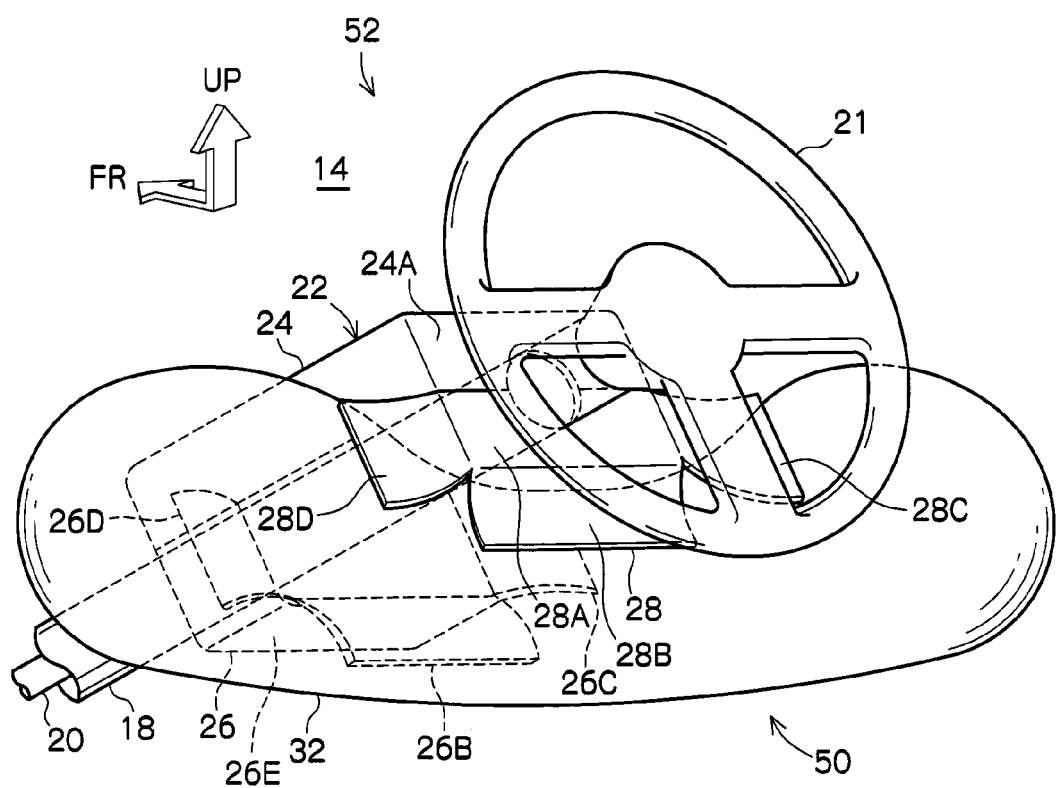
FIG. 6 is a perspective view showing the inflated deployed state of the air bag of a vehicle front structure according to the second exemplary embodiment of the present invention, as viewed at an angle from the rear left of the vehicle.

A perspective view of a vehicle front structure 52 configured with an air bag device for knee protection 50 according to the second exemplary embodiment of the present invention applied thereto is shown in FIG. 6, as viewed at an angle from the rear left of the vehicle with the air bag 32 in an inflated, deployed state.

The vehicle front structure 52 according to the present exemplary embodiment is of substantially the same configuration as that of the first exemplary embodiment described above, however, there are the following differences.

In the vehicle front structure 52 of the present exemplary embodiment, the vehicle rear face of the first lower column cover 26 opens out. The vehicle front portion of the first lower column cover 26 is a body portion 26E, and the vehicle-right-side wall and the vehicle-left-side wall of the body portion 26E are respectively connected to the vehicle-right-side wall and the vehicle-left-side wall of the upper column cover 24.

The vehicle-rear-side portion of the bottom wall of the first lower column cover 26 is a lower opening wall 26B, serving as a opening door, and the lower opening wall 26B is not connected to the bottom wall 28B of the second lower column cover 28. The vehicle-rear-side portions of the vehicle-right-side wall and the vehicle-left-side wall of the first lower column cover 26 are respectively a right opening wall 26C and a left opening wall 26D, which serve as opening doors. The right opening wall 26C and the left opening wall 26D are not connected, respectively, to the vehicle-right-side wall and the vehicle-left-side wall of the upper column cover 24, and are also not connected, respectively, to the right side wall 28C and the left side wall 28D of the second lower column cover 28.

The thickness of the right opening wall 26C and the left opening wall 26D in the first lower column cover 26 is the same as the thickness T1 of the right side wall 28C and the left side wall 28D of the second lower column cover 28, and, serving as a regulator, the thickness T1 of the right opening wall 26C and the left opening wall 26D is thinner than the thickness T2 of the lower opening wall 26B. Thereby, the rigidity of the right opening wall 26C and the left opening wall 26D is weaker than the rigidity of the lower opening wall 26B. In addition, the thickness T2 of the lower opening wall 26B is the same as the thickness of the body portion 26E of the first lower column cover 26.

Similar tear portions 30 to those of the above first exemplary embodiment are formed to the internal surface of the boundary portion (angled portion) between the right opening wall 26C and the lower opening wall 26B of the first lower column cover 26, and to the internal surface of the boundary portion (angled portion) between the left opening wall 26D and the lower opening wall 26B of the first lower column cover 26. The thickness of the tear portions 30 formed portions of the first lower column cover 26 is thinner than the thickness of the right opening wall 26C, the left opening wall 26D, the lower opening wall 26B and the body portion 26E of the first lower column cover 26.

Explanation will now be given of the operation of the present exemplary embodiment.

In the vehicle front structure 52 of the above described configuration, when the vehicle is involved in a frontal collision (when the collision detection sensor 38 has detected a frontal collision of the vehicle), the inflator 34 under the control of the control device 36 ejects gas from the gas ejection hole. The gas is introduced into the air bag 32, and thereby the air bag 32 inflates and deploys within the column cover 22. Furthermore, the air bag 32 is inflated and deployed, and due to the pressure thereof on the right opening wall 26C, the left opening wall 26D and the lower opening wall 26B of the first lower column cover 26, and on the right side wall 28C, the left side wall 28D, and the bottom wall 28B of the second lower column cover 28, the pair of tear portions 30 of the first lower column cover 26 break toward the vehicle front portion from the vehicle rear portion thereof, and the pair of tear portions 30 of the second lower column cover 28 break toward the vehicle rear portion from the vehicle front portion thereof. Therefore, the right opening wall 26C, the left opening wall 26D and the lower opening wall 26B of the first lower column cover 26 respectively rotate and open out, with the boundary portions to the body portion 26E as the rotational centers (hinge portions), and also the right side wall 28C, the left side wall 28D and the bottom wall 28B of the second lower column cover 28 respectively rotate and open out, with the boundary portions to the lower rear wall 28A as the rotational centers (hinge portions). By so doing, the air bag 32, as shown in FIG. 6, inflates and deploys to the vehicle-right side, to the vehicle-left side and the bottom of the column cover 22 at the vehicle-rear side of the instrument panel 16, from the opened out right opening wall 26C, left opening wall 26D, lower opening wall 26B, right side wall 28C, left side wall 28D, and bottom wall 28B, the air bag 32 is thereby able to restrain and protect both knees of the driver moving in the vehicle forward direction under inertia.

In addition, the thickness T1 of the right opening wall 26C and the left opening wall 26D of the first lower column cover 26 is thinner in comparison to the thickness T2 of the lower opening wall 26B of the first lower column cover 26, and the thickness T1 of the right side wall 28C and the left side wall 28D of the second lower column cover 28 is thinner in comparison to the thickness T2 of the bottom wall 28B of the second lower column cover 28. Therefore, the lower opening wall 26B of the first lower column cover 26 is opened after the right opening wall 26C and the left opening wall 26D of the first lower column cover 26 have opened, and also the bottom wall 28B of the second lower column cover 28 is opened after the right side wall 28C and the left side wall 28D of the second lower column cover 28 have opened.

Due to the above, a similar effect in the present exemplary embodiment to that of the above first exemplary embodiment can thereby also be exhibited.

Figure 7:
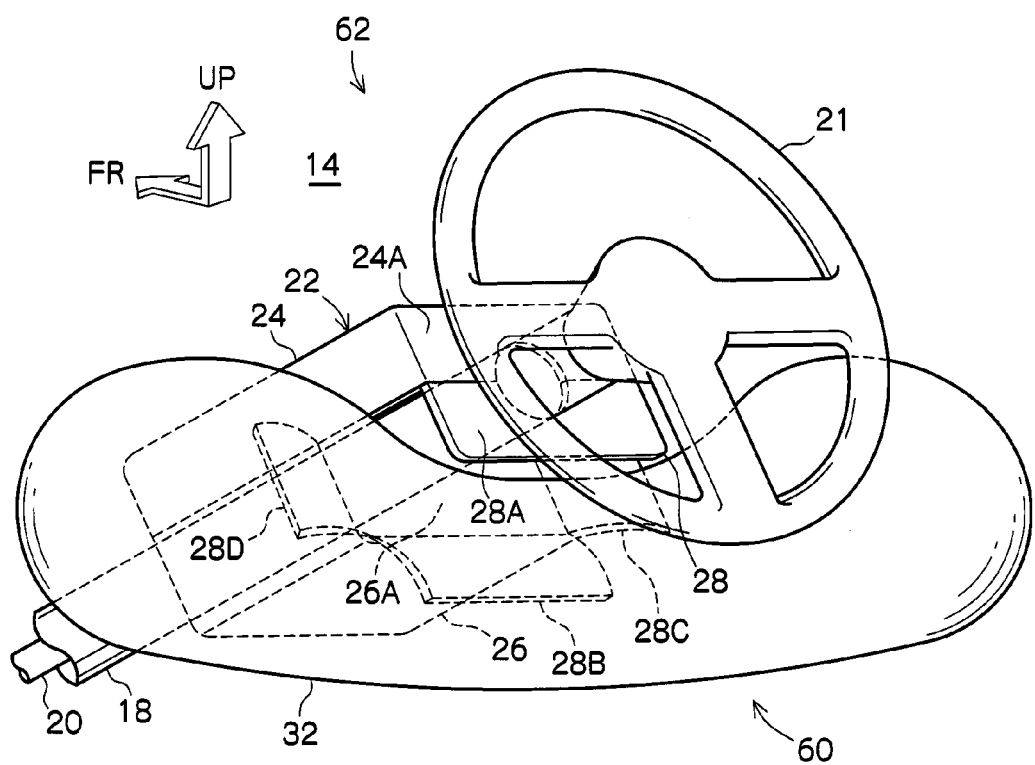
FIG. 7 is a perspective view showing the inflated deployed state of the air bag of a vehicle front structure according to the third exemplary embodiment of the present invention, as viewed at an angle from the rear left of the vehicle.

Third Exemplary Embodiment perspective view of a vehicle front structure 62 configured with an air bag device for knee protection 60 according to the third exemplary embodiment of the present invention applied thereto is shown in FIG. 7, as viewed at an angle from the rear left of the vehicle with the air bag 32 in an inflated, deployed state.

The vehicle front structure 62 according to the present exemplary embodiment is of substantially the same configuration as that of the first exemplary embodiment described above, however, there are the following differences.

In the vehicle front structure 62 of the present exemplary embodiment, the bottom wall 28B of the second lower column cover 28 is connected to the bottom wall of the first lower column cover 26, and also the right side wall 28C and the left side wall 28D of the second lower column cover 28 are connected, respectively, to the vehicle-right-side wall and the vehicle-left-side wall of the first lower column cover 26.

There are tear portions 30 formed to the internal surfaces of the boundary portions (angled portions) between the right side wall 28C and the left side wall 28D with the bottom wall 28B, and also to the internal surfaces of the boundary portions (angled portions) between the right side wall 28C, the left side wall 28D, and the bottom wall 28B with the lower rear wall 28A. The formation depth of the tear portions 30 is so as to be shallower at the boundary portion between the bottom wall 28B and the lower rear wall 28A in comparison to at the boundary portions between the right side wall 28C and the left side wall 28D with the lower rear wall 28A, and the thickness of the tear portion 30 formed portions of the second lower column cover 28 is such that the boundary portion between the bottom wall 28B and the lower rear wall 28A is thicker in comparison to the boundary portions of the right side wall 28C and the left side wall 28D with the lower rear wall 28A.

Explanation will now be given of the operation of the present exemplary embodiment.

In the vehicle front structure 62 of the above described configuration, when the vehicle is involved in a frontal collision (when the collision detection sensor 38 has detected a frontal collision of the vehicle), the inflator 34 under the control of the control device 36 ejects gas from the gas ejection hole. The gas is introduced into the air bag 32, and thereby the air bag 32 inflates and deploys in the portion within the column cover 22 surrounded by the central rear wall 26A of the first lower column cover 26 and the second lower column cover 28. Furthermore, the air bag 32 is inflated and deployed, and due to the pressure thereof on the right side wall 28C, the left side wall 28D, and the bottom wall 28B of the second lower column cover 28, the tear portions 30 of the second lower column cover 28 at the boundary portions between the right side wall 28C, left side wall 28D, and right side wall 28C with the lower rear wall 28A break, and the tear portions 30 of the second lower column cover 28 at the boundary portions between the right side wall 28C and left side wall 28D with the bottom wall 28B break toward the vehicle front portion from the vehicle rear portion thereof, and the right side wall 28C, the left side wall 28D and the bottom wall 28B respectively rotate about the boundary portions (connection portions) thereof to the first lower column cover 26 as the rotational centers (hinge portions), and open out. By so doing, the air bag 32, as shown in FIG. 7, inflates and deploys to the vehicle-right side, to the vehicle-left side and the bottom of the column cover 22 at the vehicle-rear side of the instrument panel 16, from the opened out right side wall 28C, left side wall 28D, and bottom wall 28B, and the air bag 32 is thereby able to restrain and protect both knees of the driver moving in the vehicle forward direction under inertia.

Due to the above, a similar effect in the present exemplary embodiment to that of the above first exemplary embodiment can thereby also be exhibited.

However, the thickness of the tear portion 30 formed portion of the second lower column cover 28 is such that the boundary portion of the bottom wall 28B with the lower rear wall 28A is thicker in comparison to the boundary portions of the right side wall 28C and the left side wall 28D to the lower rear wall 28A. Therefore, in the event of a vehicle frontal collision, the bottom wall 28B is opened even more certainly after the right side wall 28C and the left side wall 28D have opened.

Fourth Exemplary Embodiment

Figure 8:
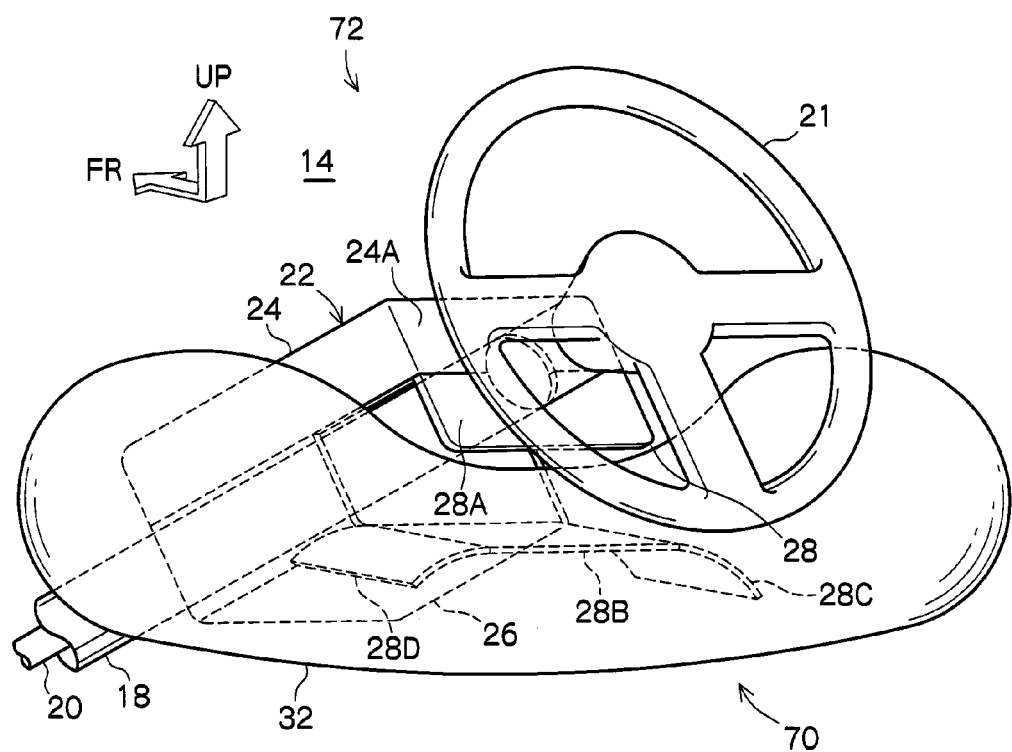
FIG. 8 is a perspective view showing the inflated deployed state of the air bag of a vehicle front structure according to the fourth exemplary embodiment of the present invention, as viewed at an angle from the rear left of the vehicle.
Figure 9:
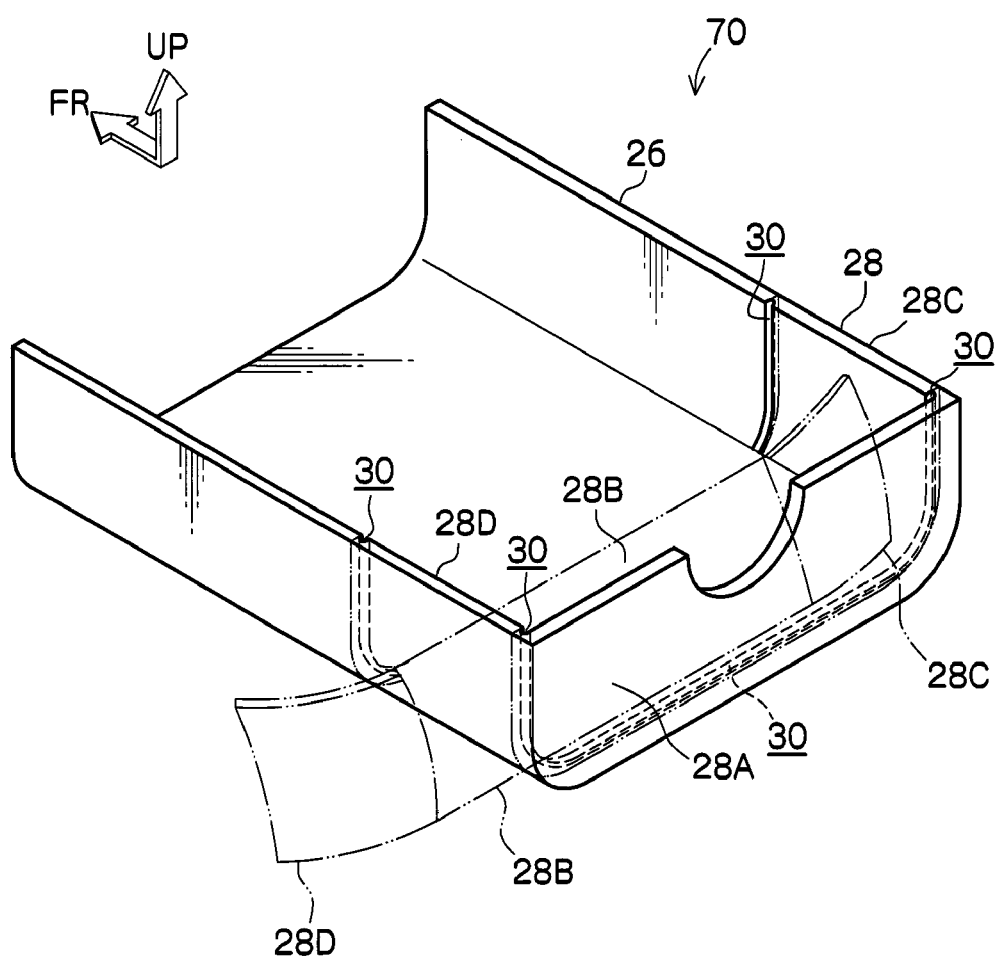
FIG. 9 is a perspective view showing principal portions of an air bag device for knee protection according to the fourth exemplary embodiment of the present invention, as viewed at an angle from the rear left of the vehicle.

A perspective view of a vehicle front structure 72 configured with an air bag device for knee protection 70 according to the fourth exemplary embodiment of the present invention applied thereto is shown in FIG. 8, as viewed at an angle from the rear left of the vehicle with the air bag 32 in an inflated and deployed state. A perspective view of principal portions of the air bag device for knee protection 70 are shown in FIG. 9, as viewed at an angle from the rear left of the vehicle.

The vehicle front structure 72 according to the present exemplary embodiment is of substantially the same configuration as that of the first exemplary embodiment described above, however, there are the following differences.

In the vehicle front structure 72 of the present exemplary embodiment, the first lower column cover 26 and the second lower column cover 28 are made as a unit (are connected together), and there is no central rear wall 26A provided at the first lower column cover 26, as is the case in the first exemplary embodiment.

There are no tear portions 30 formed to the internal surface of the boundary portion (angled portion) between the right side wall 28C and the left side wall 28D with the bottom wall 28B, and the tear portions 30 are formed to the internal surface of the boundary portion between the right side wall 28C and the left side wall 28D with the first lower column cover 26, and the tear portions 30 are formed to the internal surface of the boundary portion (angled portion) between the right side wall 28C, the left side wall 28D and the bottom wall 28B to the lower rear wall 28A. The formation depth of the tear portions 30 is shallower at the boundary portion between the bottom wall 28B and the lower rear wall 28A in comparison to at the boundary portions between the right side wall 28C with the first lower column cover 26 and the lower rear wall 28A and in comparison to at the boundary portions between the left side wall 28D with the first lower column cover 26 and the lower rear wall 28A. The thickness of the tear portion 30 formed portions of the column cover 22 is such that the boundary portion between the bottom wall 28B and the lower rear wall 28A is thicker in comparison to the boundary portions between the right side wall 28C with the first lower column cover 26 and the lower rear wall 28A and between the left side wall 28D with the first lower column cover 26 and the lower rear wall 28A.

Explanation will now be given of the operation of the present exemplary embodiment.

In the vehicle front structure 72 of the above described configuration, when the vehicle is involved in a frontal collision (when the collision detection sensor 38 has detected a frontal collision of the vehicle), the inflator 34 under the control of the control device 36 ejects gas from the gas ejection hole. The gas is introduced into the air bag 32, and thereby the air bag 32 inflates and deploys within the column cover 22. Furthermore, the air bag 32 is inflated and deployed, and due to the pressure thereof on the right side wall 28C, the left side wall 28D, and the bottom wall 28B of the second lower column cover 28, as shown by the double dotted intermittent lines in FIG. 9, the tear portions 30 at the boundary portions between the right side wall 28C and left side wall 28D of the second lower column cover 28 with the first lower column cover 26, and the tear portions 30 at the boundary portions between the right side wall 28C and the left side wall 28D with the lower rear wall 28A, break from the top down toward the bottom. The right side wall 28C and the left side wall 28D respectively rotate about the boundary portions thereof to the bottom wall 28B as the rotational centers (hinge portions), and open out. Then the tear portion 30 separates between the bottom wall 28B and the lower rear wall 28A of the second lower column cover 28, and the bottom wall 28B rotates with the boundary portion (connection portion) thereof with the first lower column cover 26 as the rotational center (hinge portion), and opens out. By so doing, the air bag 32, as shown in FIG. 8, inflates and deploys to the vehicle-right side, to the vehicle-left side and the bottom of the column cover 22 at the vehicle-rear side of the instrument panel 16, from the opened out right side wall 28C, left side wall 28D, and bottom wall 28B, and the air bag 32 thereby is able to restrain and protect both knees of the driver moving in the vehicle forward direction under inertia.

Due to the above, a similar effect in the present exemplary embodiment to that of the above first exemplary embodiment can thereby also be exhibited.

However, the thickness of the tear portion 30 formed portion of the column cover 22 is such that the boundary portion of the bottom wall 28B with the lower rear wall 28A is thicker in comparison to the boundary portions of the right side wall 28C to the first lower column cover 26 and the lower rear wall 28A, and in comparison to the boundary portions of the left side wall 28D with the first lower column cover 26 and the lower rear wall 28A. Therefore, in the event of the vehicle frontal collision, the bottom wall 28B is opened even more certainly after the right side wall 28C and the left side wall 28D have opened.

It should be noted that in the present exemplary embodiment the tear portion 30 is formed on the internal surface of the boundary portion (angled portion) of the bottom wall 28B and the lower rear wall 28A of the second lower column cover 28, and thereby when the air bag 32 has inflated and deployed, the bottom wall 28B is configured to open out by rotating with the boundary portion (connection portion) with the first lower column cover 26 as the center of rotation (hinge portion), due to breaking of the tear portion 30. However, configuration may be made with the tear portion 30 formed on the internal surface of the boundary portion between the bottom wall 28B of the second lower column cover 28 and the first lower column cover 26, and thereby when the air bag 32 has inflated and deployed, the bottom wall 28B is configured to open out by rotating with the boundary portion (angled portion) with the lower rear wall 28A as the center of rotation (hinge portion), due to breaking of the tear portion 30. In addition, configuration may be made with no tear portion 30 formed to the internal surface of the boundary portion between the bottom wall 28B of the second lower column cover 28 with the lower rear wall 28A and with the first lower column cover 26, so that the bottom wall 28B does not open when the air bag 32 has inflated and deployed.

Also, in the first exemplary embodiment to the fourth exemplary embodiment, the air bag 32 inflates and deploys under the control of the control device 36 when the collision detection sensor 38 has detected a frontal collision of the vehicle, with the right side wall 28C, the left side wall 28D and the bottom wall 28B of the second lower column cover 28 (including the right opening wall 26C, left opening wall 26D and lower opening wall 26B in the second exemplary embodiment) opening out. However, configuration may be made such that the air bag 32 inflates and deploys under the control of the control device 36 when the collision prediction sensor 40 has predicted a frontal collision of the vehicle, with the right side wall 28C, the left side wall 28D and the bottom wall 28B of the second lower column cover 28 (including the right opening wall 26C, left opening wall 26D and lower opening wall 26B in the second exemplary embodiment) opening out. By so doing, the air bag 32 is capable of being inflated and deployed at an early stage to the vehicle-right side, vehicle-left side and bottom of the column cover 22.

Furthermore, in the above first exemplary embodiment to fourth exemplary embodiment, the thickness T1 of the right side wall 28C and left side wall 28D of the second lower column cover 28 (including the right opening wall 26C and the left opening wall 26D in the second exemplary embodiment) is configured thinner in comparison with the thickness T2 of the bottom wall 28B of the second lower column cover 28 (including the lower opening wall 26B in the second exemplary embodiment). However, for example, the material of the right side wall 28C and the left side wall 28D of the second lower column cover 28 (including the right opening wall 26C and the left opening wall 26D in the second exemplary embodiment) may be made of cloth or the like, with the rigidity of the material for the right side wall 28C and the left side wall 28D of the second lower column cover 28 (including the right opening wall 26C and the left opening wall 26D in the second exemplary embodiment) configured weaker in comparison to the rigidity of the material of the bottom wall 28B of the second lower column cover 28 (including the lower opening wall 26B in the second exemplary embodiment).

The positions of the opening doors and the positions of the rotational centers (break portions) in the column cover are not limited to the positions in the above first exemplary embodiment to the fourth exemplary embodiment, and these positions may be suitably determined according to the mounting position of the air bag within the column cover, the positions of the knees of the driver (vehicle occupant), and the like. For example, in order for the air bag to inflate and open out along the bottom wall 28B, the position of the rotational center of the second lower column cover 28 (the opening direction of the bottom wall 28B) when the bottom wall 28B opens may be determined according to the mounting position of the air bag. Specifically, the bottom wall 28B (opening door) may be configured to open with the vehicle-rear-side edge thereof as the rotational center, as in the above first exemplary embodiment (see FIG. 2), when the mounting position of the air bag is on the vehicle-rear side, and the bottom wall 28B (opening door) may be configured to open with the vehicle front edge thereof as the rotational center, as in the above third exemplary embodiment and fourth exemplary embodiment (see FIGS. 7 and 8), when the mounting position of the air bag is on the vehicle-front side.

The invention claimed is:

1. An air bag device for knee protection comprising:
a column cover that covers a steering column of a vehicle;
opening doors provided within the range of a vehicle-right-side wall and a vehicle-left-side wall of the column cover and at a bottom wall of the column cover so as to be openable; and
an air bag provided within the column cover, the air bag deploying to the vehicle-right side and the vehicle-left side of the column cover by opening of the opening doors that are respectively provided within the range of the vehicle-right-side wall and the vehicle-left-side wall of the column cover, the air bag being thus configured to protect the knees of a vehicle occupant, the opening door that is provided at the bottom wall of the column cover opening after the opening doors at the vehicle-right-side wall and the vehicle-left-side wall of the column cover have opened.

2. The air bag device for knee protection according to claim 1, further comprising:
a collision prediction sensor for predicting a vehicle collision;
a door opener that opens the opening doors in the vehicle-right-side wall and the vehicle-left-side wall of the column cover when a vehicle collision is predicted by the collision prediction sensor.

3. The air bag device for knee protection according to claim 1, further comprising:
a regulator that regulates the opening of at least one of the opening doors caused by the deploying of the air bag.

4. The air bag device for knee protection according to claim 3, wherein the regulator is a break portion that is thin in comparison to the thickness of other portions of the column cover, the break portion being provided at an edge portion on the periphery of at least one of the opening doors at the column cover.

5. The air bag device for knee protection according to claim 3, wherein the regulator is the thickness of the opening doors at the vehicle-right-side wall and the vehicle-left-side wall of the column cover, which are thinner than the thickness of the opening door at the bottom wall of the column cover.

6. The air bag device for knee protection according to claim 3, wherein the regulator is the rigidity of the material of the opening doors at the vehicle-right-side wall and the vehicle-left-side wall of the column cover, being weaker than the rigidity of the material of portions of the column cover other than at the opening doors at the vehicle-right-side wall and the vehicle-left-side wall of the column cover.

7. The air bag device for knee protection according to claim 4, wherein the strength of at least one of the break portions at the edge on the periphery of the opening doors at the vehicle-right-side wall and the vehicle-left-side wall of the column cover is lower than the strength of the break portion at the edge portion on the periphery of the opening door at the bottom wall of the column cover.

8. The air bag device for knee protection according to claim 1, wherein the opening doors respectively open about the vehicle front edge thereof, the vehicle rear edge thereof, the vehicle upper edge thereof, or the vehicle lower edge thereof.

9. The air bag device for knee protection according to claim 1, wherein a plurality of the opening doors is provided in at least one of the vehicle-left-side wall, the vehicle-right-side wall and the bottom wall of the column cover.

10. A vehicle comprising the air bag device for knee protection according to claim 1.

11. A deployment method for an air bag device for knee protection comprising:
    providing an air bag device for knee protection comprising a column cover that covers a steering column of a vehicle, opening doors provided within the range of a vehicle-right-side wall and a vehicle-left-side wall of the column cover and at a bottom wall of the column cover so as to be openable, and an air bag provided within the column cover; and
    deploying the air bag to the vehicle-right side and the vehicle-left side of the column cover by opening of the opening doors that are respectively provided within the range of the vehicle-right-side wall and the vehicle-left-side wall of the column cover, enabling the air bag to protect the knees of a vehicle occupant, opening the opening door that is provided at the bottom wall of the column cover after the opening doors at the vehicle-right-side wall and the vehicle-left-side wall of the column cover have opened.

12. The deployment method for an air bag device for knee protection according to claim 11, wherein a door opener opens the opening doors in the vehicle-right-side wall and the vehicle-left-side wall of the column cover when a vehicle collision is predicted by a collision prediction sensor.

13. The deployment method for an air bag device for knee protection according to claim 11, wherein a regulator regulates the opening of at least one of the opening doors caused by the deploying of the air bag.

14. The deployment method for an air bag device for knee protection according to claim 13, wherein the regulator is a break portion that is thin in comparison to the thickness of other portions of the column cover, the break portion being provided at an edge portion on the periphery of at least one of the opening doors at the column cover.

15. The deployment method for an air bag device for knee protection according to claim 14, wherein the strength of at least one of the break portions at the edge on the periphery of the opening doors at the vehicle-right-side wall and the vehicle-left-side wall of the column cover is lower than the strength of the break portion at the edge portion on the periphery of the opening door at the bottom wall of the column cover.

16. The deployment method for an air bag device for knee protection according to claim 13, wherein the regulator is the thickness of the opening doors at the vehicle-right-side wall and the vehicle-left-side wall of the column cover, which are thinner than the thickness of the opening door at the bottom wall of the column cover.

17. The deployment method for an air bag device for knee protection according to claim 13, wherein the regulator is the rigidity of the material of the opening doors at the vehicle-right-side wall and the vehicle-left-side wall of the column cover, being weaker than the rigidity of the material of portions of the column cover other than at the opening doors at the vehicle-right-side wall and the vehicle-left-side wall of the column cover.

18. The deployment method for an air bag device for knee protection according to claim 11, wherein the opening doors respectively open about the vehicle front edge thereof, the vehicle rear edge thereof, the vehicle upper edge thereof, or the vehicle lower edge thereof.

* * * * *